United States Patent
Wallace et al.

(10) Patent No.: US 8,914,338 B1
(45) Date of Patent: Dec. 16, 2014

(54) OUT-OF-CORE SIMILARITY MATCHING

(75) Inventors: Grant Wallace, Pennington, NJ (US); Philip N. Shilane, Yardley, PA (US); Frederick Douglis, Basking Ridge, NJ (US)

(73) Assignee: EMC Corporation, Hopkinton, MA (US)

( * ) Notice: Subject to any disclaimer, the term of this patent is extended or adjusted under 35 U.S.C. 154(b) by 131 days.

(21) Appl. No.: 13/335,416

(22) Filed: Dec. 22, 2011

(51) Int. Cl.
*G06F 17/30* (2006.01)

(52) U.S. Cl.
CPC ...... *G06F 17/3007* (2013.01); *G06F 17/30156* (2013.01)
USPC ............ 707/693; 707/692; 707/752; 707/825

(58) Field of Classification Search
CPC ........................ G06F 17/3007; G06F 17/30156
USPC ............. 707/1, 200, 752, 609, 661, 668, 674, 707/681, 705, 755, 790, 802, 803, 812
See application file for complete search history.

(56) References Cited

U.S. PATENT DOCUMENTS

| | | | |
|---|---|---|---|
| 7,443,321 B1 * | 10/2008 | Kaufman et al. | 341/87 |
| 7,610,283 B2 * | 10/2009 | Arasu et al. | 707/999.001 |
| 7,689,764 B1 | 3/2010 | de Spiegeleer et al. | |
| 7,797,279 B1 | 9/2010 | Starling et al. | |
| 7,814,078 B1 | 10/2010 | Forman et al. | |
| 7,885,988 B2 * | 2/2011 | Bashyam et al. | 707/812 |
| 8,060,476 B1 * | 11/2011 | Afonso et al. | 707/649 |
| 8,112,496 B2 * | 2/2012 | Manasse et al. | 709/217 |
| 8,117,173 B2 * | 2/2012 | Gurevich et al. | 707/693 |
| 8,255,365 B2 * | 8/2012 | Zeis et al. | 707/640 |
| 8,255,434 B2 * | 8/2012 | Williams | 707/812 |
| 8,275,756 B2 * | 9/2012 | Hirsch et al. | 707/687 |
| 8,290,972 B1 | 10/2012 | Deshmukh et al. | |
| 8,412,848 B2 * | 4/2013 | Therrien et al. | 709/247 |
| 8,417,727 B2 * | 4/2013 | Slezak et al. | 707/792 |
| 2004/0215501 A1 | 10/2004 | d'Ornano | |
| 2005/0198570 A1 | 9/2005 | Otsuka et al. | |
| 2007/0124415 A1 | 5/2007 | Lev-Ran et al. | |
| 2008/0243878 A1 | 10/2008 | de Spiegeleer et al. | |
| 2008/0243953 A1 | 10/2008 | Wu et al. | |

(Continued)

OTHER PUBLICATIONS

Dong, Wei, et al., "Tradeoffs in Scalable Data Routing for Deduplication Clusters", *Proceedings of the 9th USENIX Conference on File and Storage Technologies (FAST 2011)*, San Jose, CA, USA, 2011, 15 pagesNov. 1, 2011.

(Continued)

*Primary Examiner* — Jay Morrison
*Assistant Examiner* — Dangelino Gortayo
(74) *Attorney, Agent, or Firm* — Blakely Sokoloff Taylor & Zafman LLP

(57) ABSTRACT

A method for storing data in a data storage system by partitioning the data into a plurality of data chunks and generating representative data for each of the plurality of chunks by applying a predetermined algorithm to each chunk of the plurality of chunks. Subsequently, the representative data is compared and sorted. Representative data for base data chunks and representative data for other data chunks that can be stored relative to the base data chunks are identified by evaluating the sorted set of representative data. Finally, each of the other data chunks identified as those that can be stored relative to a base data chunk are stored in the data storage system as the difference between the data chunk and a base data chunk.

21 Claims, 4 Drawing Sheets

(56) References Cited

U.S. PATENT DOCUMENTS

| | | |
|---|---|---|
| 2008/0256326 A1 | 10/2008 | Patterson |
| 2008/0281908 A1 | 11/2008 | McCanne et al. |
| 2009/0049260 A1 | 2/2009 | Upadhyayula |
| 2010/0094817 A1 | 4/2010 | Ben-Shaul et al. |
| 2012/0036113 A1 | 2/2012 | Lillibridge et al. |
| 2012/0166448 A1* | 6/2012 | Li et al. .......................... 707/747 |
| 2012/0239630 A1 | 9/2012 | Wideman et al. |

OTHER PUBLICATIONS

Zhu, Benjamin, et al., "Avoiding the Disk Bottleneck in the Data Domain Deduplicaiotn File Systems", *Proceedings of the 6th USENIX Conference on File and Storage Technologies (FAST '08)*, San Jose, CA, USA, 2008, 14 pages.

Non-Final Office Action, U.S. Appl. No. 13/335,746, dated Mar. 1, 2013, (14 pages).

Non-Final Office Action, U.S. Appl. No. 13/335,750, dated Jan. 8, 2013, (11 pages).

Final Office Action, U.S. Appl. No. 13/335,750, dated Jun. 28, 2013, 11 pages.

Notice of Allowance, U.S. Appl. No. 13/335,746, dated Sep. 9, 2013. 16 pages.

Notice of Allowance, U.S. Appl. No. 13/335,750, dated Oct. 24, 2013, 14 pages.

* cited by examiner

OUT-OF-CORE SIMILARITY MATCHING

FIELD OF INVENTION

Embodiments of the present invention relate generally to data storage systems. More particularly, embodiments of the invention relate to compressing data files through delta encoding.

BACKGROUND

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the primary data storage devices or a data storage service company. Data can be added to the storage system at any frequency and at any amount.

Data in a data storage system can be arranged hierarchically in the storage system, which is particularly necessary when the amount of data exceeds the available main memory. Consequently, auxiliary memory can be employed to accommodate large amounts of data in a data storage system. Auxiliary memory is not accessible by a computer's central processing unit (CPU), but can be read into CPU main memory in portions so that the data can be manipulated. Auxiliary memory can extend to storage that must be mounted (either automatically or manually) to be read into a CPU's main memory.

Data is represented in a data storage system by a series of bits. The bit representation of data is frequently expensive in the areas of disk space and transmission bandwidth. Therefore, it is beneficial to encode the data using fewer bits than the original representation would use. One data compression scheme is delta encoding; delta encoding involves storing some portion of data as the relative difference to another portion of data. Delta encoding can be implemented some different ways, but a typical issue with delta encoding is how to select which portion of data should be encoded and relative to what other portion of data it should be stored. Consequently, delta encoding results in a partitioned data file requiring reassembly as a whole when accessed, as well as reassembly of those portions of the data stored as the relative difference to another portion. To enable this process, a file has a recipe for reconstruction, which typically consists of a list of fingerprints and related information corresponding to unique data chunks (i.e., fractional components of the data as a whole) stored in the data storage system.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
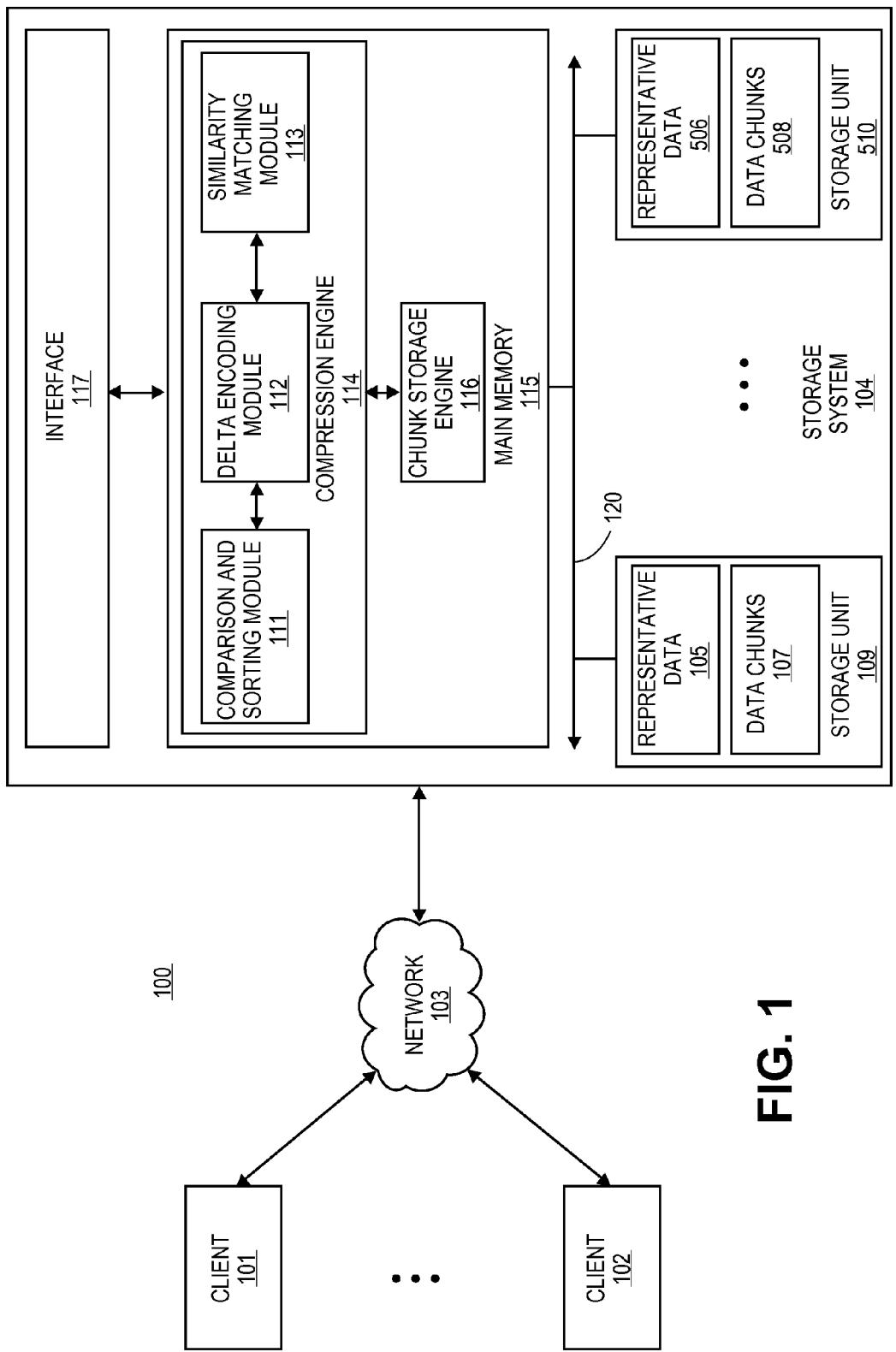
FIG. 1 is a block diagram of one embodiment of a data storage system.

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

According to some embodiments, a data storage system can divide data into small regions either when the data are stored or after the data are stored. The division process results in data "chunks" or "segments" that are fractional components of the data as a whole and can be of any size, such as 8 kilobytes (KB). Each data chunk is formed through a specific policy, e.g. by breaking a data file based on properties of the content in the data file, which permits changes to one data chunk without affecting the boundaries or contents of other data chunks. The division process aims to partition the data into chunks of an average size (e.g., 8 KB), but there can be acceptable minimum and maximum limits for the size of a chunk that are less than and greater than the target chunk size, respectively; for example, if the target chunk size is 8 KB, then a chunk of an acceptable size can be greater than 4 KB and less than 16 KB, and therefore not necessarily exactly 8 KB. However, in an alternative embodiment data can be partitioned into fixed-size data blocks (e.g., 8 KB blocks) instead of variable-sized data chunks. This division process allows portions of data in a data storage system to be manipulated without disrupting the data as a whole.

In an alternative embodiment, data in the data storage system does not need to be partitioned. The processes and structures described herein can also operate on data blocks including fixed- or variable-sized data blocks rather than data chunks of partitioned data. The data blocks can be any size (e.g., 8 KB blocks) or within any range of sizes. The embodiments are further described herein in reference to segmented data for sake of clarity. One skilled in the art would understand that the processes and structures described herein are also applicable to data blocks and similarly organized data.

According to some embodiments, a mechanism is provided for improving storage compression after data are stored in a data storage system. After data are divided into chunks in a data storage system, some data chunks will have the same or similar bit pattern. Therefore, it can be inefficient to store all data chunks having the same or similar bit patterns in their entirety because the data storage system would be replete with duplicate bit patterns. As an alternative, a data chunk having the same or similar bit pattern to another data chunk (i.e., a base data chunk) can be stored as the difference between the data chunk and the base data chunk. Some illustrative embodiments of the selection of a base data chunk are explored further below. The data chunk generated as the relative difference to the base data chunk can be referred to herein as the delta data chunk. Typically, the delta data chunk includes the content data that is not present in the base data chunk along with meta-information allowing the original data chunk to be reassembled by incorporating data from the base data chunk. The meta-information can include information such as an indicator that a data chunk is a delta data chunk and so needs to be reassembled when accessed, the location in the data storage system of the base data chunk, a list of instructions for recreating the delta data chunk (i.e., a list of offsets and copy or insert instructions where copy instructions reference the base data chunk), and other related information. Viewed as a whole, this mechanism of data storage compression can be referred to as delta encoding. When the entire data set is accessed, a file recipe including the data chunk information and other related information instructs the data storage system on how the data set should be constructed.

In one embodiment, each base data chunk is a unique data chunk that is distinct from all other base data chunks. Each of these unique data chunks is assigned a unique value, or "fingerprint," so that each unique data chunk is identifiably distinguishable from any other data chunk by reference to the associated fingerprint. In one embodiment, this fingerprint is unique in the set of all data chunks unless two data chunks contain exactly the same data (i.e., there is a one to one correspondence between unique data chunks and fingerprint values); in such an instance, two data chunks with identical bit patterns would have the same fingerprint. In one embodiment, a hash function, such as a Secure Hash Algorithm-1 (SHA-1) function or Message-Digest 5 (MD5) function, can provide the fingerprint by inputting the data chunk into the hash function. In one embodiment, the hash function is collision-resistant to protect against duplicate fingerprints for data chunks having differing data. As an alternative to or in addition to a fingerprint, in one embodiment each data chunk has a globally unique identifier that is not contingent upon bit pattern. This globally unique identifier can be attained through different methods and can be predetermined before the data are compressed.

In one embodiment, each data chunk is assigned a representative value. This representative value has at least the property that the probability of the corresponding data chunk having the same representative value as another data chunk is proportional to the data similarity of the corresponding data chunk and the other data chunk. Accordingly, two data chunks having the same bit pattern would also have the same representative value. In one embodiment, the representative value is attained through a weak hash function by inputting the data chunk into the hash function. This weak hash function can allow collisions, particularly to indicate similarity of bit patterns between data chunks being hashed. This hash function can be predetermined. In one embodiment, the weak hash function is a resemblance hash algorithm. A resemblance hash algorithm is a weak hash algorithm wherein data chunks with similar data would generate the same hash value.

FIG. 1 is a block diagram illustrating a data storage system according to one embodiment of the invention. Referring to FIG. 1, system 100 includes, but is not limited to, one or more client systems 101-102 communicatively coupled to a data storage system 104 over network 103. Clients 101-102 can be any type of clients such as a server, a personal computer (e.g., desktops, laptops, and tablets), a "thin" client, a personal digital assistant (PDA), a Web-enabled appliance, a gaming device, a media player, or a mobile phone (e.g., Smartphone), etc. Network 103 can be any type of network such as a local area network (LAN), a wide area network (WAN) such as Internet, a corporate intranet, a metropolitan area network (MAN), a storage area network (SAN), a bus, or a combination thereof, wired and/or wireless.

Storage system 104 can include any type of server or cluster of servers. For example, storage system 104 can be a storage server used for any of various different purposes, such as to provide multiple users with access to shared data and/or to back up mission-critical data. Storage system 104 can be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 can have a distributed architecture, or all of its components can be integrated into a single unit. Storage system 104 can be implemented as part of an archive and/or backup system such as a de-duplication storage system available from EMC® Corporation of Hopkinton, Mass. Additionally, storage system 104 can be communicatively coupled to an auxiliary storage system similar to storage system 104. The auxiliary storage system can duplicate the function of storage system 104. Alternatively or in addition to storage system 104, the auxiliary storage system can provide some additional data warehousing or data manipulation.

In one embodiment, storage system 104 includes, but is not limited to, several components: interface 117; main memory 115; chunk storage engine 116; compression engine 114 with comparison and sorting module 111, delta encoding module 112, and similarity matching module 113; and one or more storage units 109-110 communicatively. Storage units 109-110 can be implemented locally (e.g., single-node operating environment) or remotely (e.g., multi-node operating environment) via interconnect 120, which can be a bus or a network. In one embodiment, one of the storage units 109-110 operates as an active storage to receive and store external or fresh user data, while the other storage unit operates as a target storage unit to periodically archive data from the active storage unit according to an archiving policy or scheme. Storage units 109-110 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 109-110 can also be combinations of such devices. In the case of disk storage media, the storage units 109-110 can be organized into one or more volumes of Redundant Array of Inexpensive Disks (RAID).

In one embodiment, storage system 104 as shown in FIG. 1 can be used as a tier of storage in a storage hierarchy that comprises other tiers of storage. One or more tiers of storage in this hierarchy can utilize different kinds of storage devices and/or can be optimized for different characteristics such as random update performance. Data are periodically moved among the tiers based on data management policies to achieve a cost-effective match to the current storage requirements of the data files. For example, data can initially be stored in a tier of storage that offers high performance for reads and writes. As the data ages, it can be moved into a different tier of storage. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, in one embodiment, data to be stored in the data storage system is partitioned into a plurality of data chunks by chunk storage engine 116. Subsequently, as the data chunks 107-108 are stored in storage units 109-110, respectively, representative data associated with the data chunks are computed and stored in the storage units such as representative data 105-106. In one embodiment, representative data are computed for or extracted from each of the data chunks when the corresponding data chunks are stored in a storage unit. For example, the representative data 105-106 can be generated by a representative data generator (not shown) of compression engine 114 when the corresponding file or files are partitioned and then stored in any of storage units 109-110 by way of chunk storage engine 116. In computing the representative data, a variety of data filtering techniques can be utilized to exclude certain bits (e.g., least significant bits) of the data to further improve the ability to identify target content. For example, the representative data can be computed using only a subset of bits of the data (e.g., most significant bits), thus changes to insignificant bits in the data do not prevent a match. This type of filtering of the target content is appropriate for some types of content (e.g., pictures or video). Note that delta data chunks can also be stored in a separate storage location (e.g., globally with respect to storage units 109-110) accessible by main memory 115 and consequently chunk storage engine 116 and compression engine 114, instead of being stored in individual ones of storage units 109-110. Furthermore, chunk storage engine 116 is not necessarily housed within main memory 115, but implemented as an individual component within storage system 104 and communicatively coupled to main memory 115.

Representative data can include a fingerprint of a data chunk. In one embodiment, a fingerprint can include a hash value computed based on the data chunk using a variety of hash algorithms, such as SHA-1 or MD5 hash algorithms. Alternatively, representative data can include one or more features extracted from the corresponding data chunk using a variety of feature extraction methods. Feature extraction involves simplifying the amount of resources required to describe a large set of data accurately. Feature extraction is a general term for methods of constructing combinations of the variables to get around these problems while still describing the data with sufficient accuracy. Furthermore, representative data can include a combination of a fingerprint and one or more features extracted from a corresponding data chunk. In a further embodiment, representative data does not include a fingerprint and are only composed of one or more features.

According to one embodiment, storage system 104 includes main memory 115 with chunk storage engine 116 and compression engine 114 communicatively coupled to interface 117. In response to a data file to be stored in storage units 109-110, chunk storage engine 116 is configured to partition the data file into multiple chunks according to a variety of segmentation policies or rules.

According to one embodiment, storage system 104 includes compression engine 114 communicatively coupled to interface 117 and chunk storage engine 116. In one embodiment, compression engine 114 is invoked by a client 101-102 on network 103 through interface 117 on data stored in storage system 104. In another embodiment, compression engine 114 is controlled by a scheduler through interface 117 so that compression engine 114 is cyclically invoked by the storage system 104. In even another embodiment, compression engine 114 is event driven so that it is invoked upon the happening of a particular event such as storage of data from client systems in storage system 104 or the size of data in the data storage system 104 reaching a defined threshold. According to one embodiment, compression engine 114 contains three different modules: comparison and sorting module 111, delta encoding module 112, and similarity matching module 113. According to one embodiment, when compression engine 114 receives a request to compress data that can be stored in storage units 109-110, the data can be partitioned into multiple chunks. Representative data 105-106 of each of the data chunks 107-108 is generated which can include a fingerprint or a feature extracted from the corresponding chunk.

In the simplest embodiment, data chunks 107-108 have target representative data 105-106 composed of only one feature extracted from the corresponding data chunk. This feature can be extracted by hashing the data chunks 107-108 using a weak hash (e.g., a resemblance hash) such that representative data 105-106 for each data chunk 107-108 is a semi-unique value with the property that the probability of two data chunks having the same resemblance hash is proportional to the similarity of the two data chunks. In another embodiment, each data chunk 107-108 can have representative data 105-106 derived from multiple features extracted through a variety of different weak hash functions. These individual features can be combined to a form a super feature as described below. Alternatively, each data chunk 107-108 can have representative data that is unique; the unique value for each data chunk can be calculated using a collision-resistant hash function (e.g., SHA-1 or MD5 hash algorithm). A collision-resistant hash algorithm prevents chunks with differing data from having the same value. In one embodiment, the unique values for data chunks 107-108 can be combined with one or more features to form representative data 105-106 for data chunks 107-108.

In one embodiment, representative data 105-106 for data chunks 107-108 in the compression engine 114 are submitted to the comparison and sorting module 111. In comparison and sorting module 111, representative data 105-106 of data chunks 107-108 is sorted so that all similar chunks are proximate to one another in a sorted list. Algorithms for sorting are well known in the art and can be implemented as bubble sort, selection sort, insertion sort, shell sort, comb sort, merge sort, heapsort, quicksort, counting sort, or any of a number of other algorithms for sorting.

In one embodiment, several features are combined to operate as a single super feature. A super feature involves entering more than one feature into a hash function so that a super feature match indicates a feature match for all features inputted into the hash function. Representative data with a super feature can be sorted on that super feature in comparison and sorting module 111 in a fashion algorithmically similar to that used for a single feature. Super features can make delta encoding more efficient: matching on a single feature may not be indicative of a sufficient match to justify delta encoding, however matching a super feature can indicate a very close match such that delta encoding is beneficial. Similarly, a super feature can eliminate the need to count feature matches to choose the best feature match among multiple potential base data chunks that match at least one feature because a super feature can indicate a multi-feature match. Furthermore, representative data can have more than one super feature; accordingly, matching multiple super features across representative data for data chunks indicates a greater similarity between the data chunks.

In another embodiment, representative data 105-106 for data chunks 107-108 in the compression engine 114 are submitted to the comparison and sorting module 111. In the comparison and sorting module 111, representative data 105-106 of data chunks 107-108 is then divided across a number of bin files—a process termed "binning"—such that each bin file is sized to fit in main memory. Representative data 105-106 are assigned to a bin file based on the bit pattern of the representative data such that identical representative data or similar representative data are assigned to the same bin file. Subsequently, the bin files are read into main memory 115 and sorted based on representative data 105-106.

In one embodiment, a sorted list of representative data 105-106 from the comparison and sorting module 111 is evaluated in the similarity matching module 113. In one embodiment, the similarity matching module 113 selects representative data for at least one base data chunk (i.e., base representative data). A base data chunk is a data chunk that is stored in its entirety in the data storage system 104. Further, the base data chunk functions as a template so that other data chunks can be stored relative to it; these data chunks stored as the relative difference to the base data chunk are known as delta data chunks. Among the similar matches, which may be identified using a variety of criteria, such as bit pattern similarity of the representative data, one or more may be identified as a potential base data chunk. In some embodiments, other criteria are used as an alternative to or in addition to bit pattern similarity of the representative data when designating a base data chunk. Additional or alternative criteria can include location of data chunks 107-108 in the storage units 109-110 (e.g., physical locality between data chunks on a disk or other storage medium), access patterns of data within storage system 104, the age of data within storage system 104 (e.g., the duration since it has been stored; the duration since it has been modified; a comparison of the age between data, data chunks, or data blocks; etc.), or a variety of other criteria.

The designation of representative data of a base data chunk in similarity matching module 113 is expedited by the sorted set of representative data provided by comparison and sorting module 111; consequently, representative data for a base data chunk are already proximate to representative data with similar bit patterns when received into similarity matching module 113. In the embodiment in which representative data are assigned to a bin file such that identical representative data or similar representative data are assigned to the same bin file (described above), the designation of a base data chunk is optimized and accelerated because identical or similar representative data are the only representative data evaluated in memory at one time.

In one embodiment, the designation as to whether a data chunk is a base data chunk or delta data chunk can be a property of the representative data 105-106. Accordingly, the property in the representative data for a delta data chunk can also include an association to the representative data for a base data chunk. Similarity matching module 113 can determine which data chunks are to be base data chunks and therefore set the property for the representative data of the base data chunks (i.e., designate base representative data). This determination can be made based on an algorithm which explicitly selects a base data chunk, an algorithm which prefers a base data chunk (e.g., a data chunk can be preferred as a base data chunk because it has a number of features that are similar to other data chunks), or any other method of selection. Correspondingly, similarity matching module 113 can set the associative property for representative data of delta data chunks. Similarity matching module 113 can make these determinations based on a variety of criteria, such as whether non-base representative data have the same representative data as a designated base data chunk or whether non-base representative data have a bit pattern that is similar to some degree as the representative data for a designated base data chunk. In another embodiment, this determination can be unnecessary because the representative data are already in the same bin file. In such an embodiment, only representative data for a base data chunk are identified, whereas representative data for the remaining chunks in the bin file are associated with that base representative data. Representative data associated with base representative data are termed delta representative data. Delta representative data for data chunks indicates that those data chunks can be stored as the difference between the data chunk and a data chunk with base representative data.

In one embodiment, similarity matching module 113 can estimate the compression achievable by storing a data chunk with delta representative data as the relative difference between the data chunk and a data chunk with the associated base representative data. The estimate can include the amount of space saved in the storage units 109-110 compared to the storage usage without delta encoding. This estimate can also be expressed as a percentage value of the storage usage after delta encoding in relation to the storage usage before delta encoding. Additionally or alternatively, the estimate can include the amount of storage space necessary for storing data chunks on an auxiliary storage system after delta encoding.

In one embodiment, determinations of base representative data and delta representative data are relayed to delta encoding module 112. In delta encoding module 112, a target data chunk with delta representative data is removed (i.e., deleted) from storage system 104 through chunk storage engine 116 and a delta data chunk is generated as the relative difference between the target data chunk and a data chunk with the associated base representative data. This storage technique is called delta encoding. Typically, the delta data chunk contains data not in the base data chunk as well as meta-information allowing the delta data chunk to be reassembled by incorporating corresponding data from the base data chunk. The meta-information can include information such as the location in data storage system 104 of the base data chunk, a list of instructions for recreating the delta data chunk (i.e., a list of offsets and copy or insert instructions where copy instructions reference the base chunk), an indicator that this data chunk is a delta data chunk and so needs to be reassembled when accessed, and other related information. In one embodiment, the delta data chunk is then sent to chunk storage engine 116 to be stored in data storage system 104.

Figure 2:
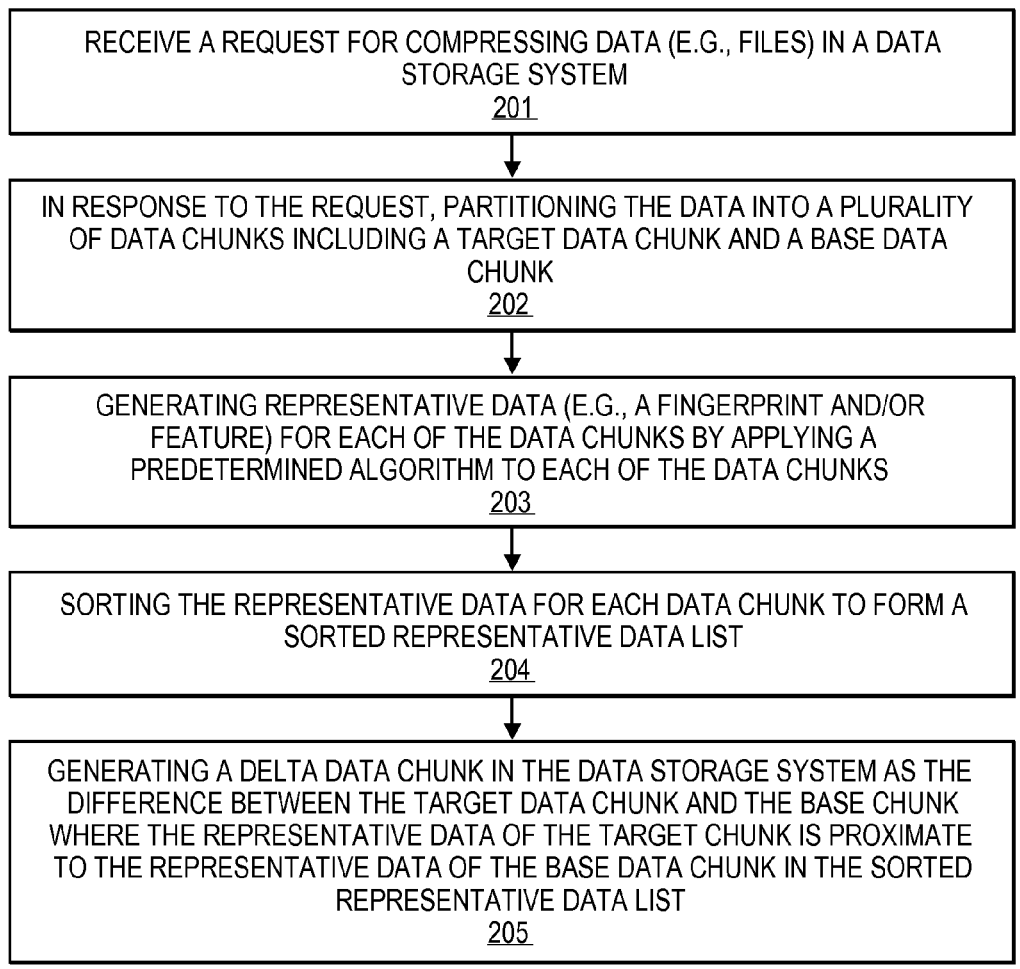
FIG. 2 is a flowchart of one embodiment illustrating a method for identifying data as a candidate for delta encoding in a data storage system.

FIG. 2 is a flow diagram illustrating a method for compressing data in a storage system based on representative data according to one embodiment of the invention. For example, method 200 can be performed by storage system 104 of FIG. 1. Referring to FIG. 2, at block 201, a request is received to compress data in a storage system. At block 202, in response to the request, the data is partitioned into a plurality of data chunks (described above). Cumulatively, the data chunks of the partitioned data represent the data, but an individual data chunk can be manipulated without compromising any other data chunks or the data as a whole. At block 203, representative data are generated for each of the individual data chunks composing the data. The representative data can include fingerprints of the data chunks, features extracted from the data chunks, or a combination of both as well as other information about the data chunks; fundamentally, this representative data can be generated through one or more predetermined algorithms, for example a hash algorithm.

Still referring to FIG. 2, at block 204 comparison and sorting module 111 sorts the representative data for the data chunks so that representative data with similar bit patterns are proximate to one another in a sorted list of representative data. At block 205, similarity matching module 113 determines whether the bit patterns of representative data are sufficiently similar, thereby indicating that it would be more efficient to store one or more data chunks as the relative difference to another data chunk. If similarity matching module 113 determines that some representative data for one or more data chunks are sufficiently similar to a particular representative data for one data chunk (i.e., proximate in the sorted list of representative data), that particular representative data can be designated as base representative data such that the similar representative data is matched with the base representative data; representative data for some target data chunk matched with base representative data is termed delta representative data. Accordingly, a delta data chunk can be generated; the delta data chunk is composed of the relative difference between the target data chunk referenced by the delta representative data and the data chunk referenced by the base representative data and some meta-data indicating how the base data chunk referenced by the base representative data should be incorporated with the delta data chunk (i.e., the delta-encoding instructions). In some embodiments, the target data chunk with delta representative data can be deleted from the data storage system after the delta data chunk is generated.

Figure 3:
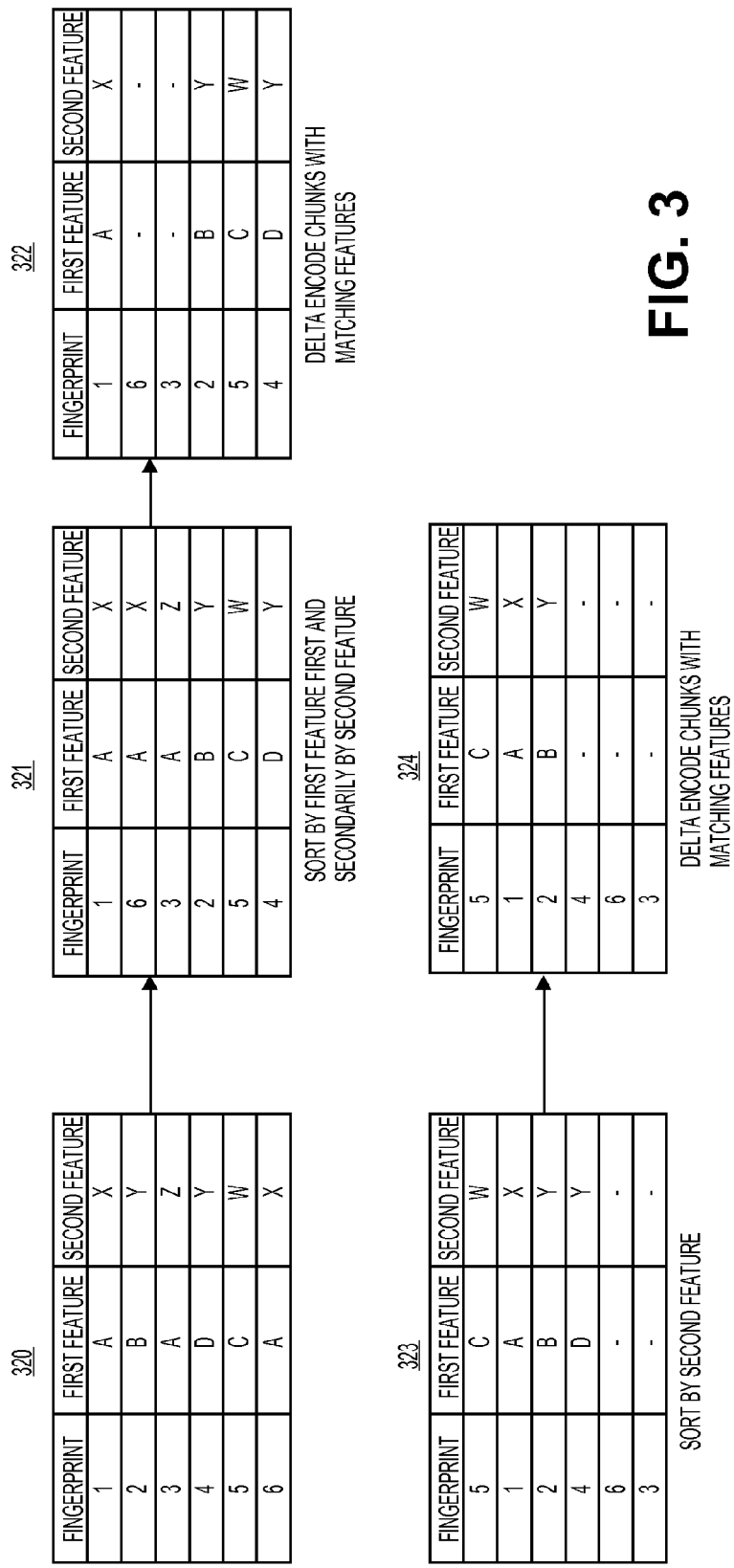
FIG. 3 is a diagram illustrating an example of the method for identifying data as a candidate for delta encoding according to one embodiment of the invention.

In one embodiment, representative data 105-106 for the data chunks 107-108 are composed of more than one feature extracted from the data chunks. In this embodiment, additional iterations through compression engine 114 can be necessary to sort the representative data on each feature in comparison and sorting module 111, similarity match the representative data on each feature in similarity matching module 113, and delta encode the data chunks in delta encoding module 112. FIG. 3 illustrates an example: If representative data are comprised of two features extracted from the data chunks, then two iterations through compression engine 114 are necessary. Beginning first with representative data for example partitioned data in a data structure 320, the first iteration sorts the representative data in comparison and sorting module 111 based on First Feature of the representative data to produce First Feature-sorted data structure 321. Accordingly, First Feature-sorted data structure 321 is evaluated in similarity matching module 113 where base representative data with Fingerprint 1 for a base data chunk are identified and delta representative data with Fingerprints 3 and 6 for delta data chunks are associated with base representative data 1.

The sorted data structure 321 identifying base representative data with Fingerprint 1 and delta representative data 3, 6 based on First Feature is subsequently transferred to delta encoding module 112 wherein the delta data chunks (not illustrated) corresponding to delta representative data 3, 6 are delta encoded with respect to the base data chunk (not illustrated) with Fingerprint 1. In this embodiment, the set of representative data is then transferred back to comparison and sorting module 111 to be sorted on Second Feature. After the set of representative data is sorted on Second Feature to produce data structure 323 containing representative data sorted on Second Feature, data structure 323 is evaluated in similarity matching module 113. In this subsequent iteration in similarity matching module 113, the data structure 323 of representative data is sorted on Second Feature and thus representative data for one chunk can be proximate to representative data for a different chunk than in the first iteration (e.g., representative data with Fingerprint 4 is now proximate to representative data with Fingerprint 2); consequently, different base representative data with Fingerprint 2 can be selected and different delta representative data with Fingerprint 4 can be associated with base representative data 2. As a result, when the data structure 323 of representative data is relayed to delta encoding module 112, the data chunk corresponding to delta representative data 4 is delta encoded with respect to the base data chunk corresponding to base representative data 2. The iterations through compression engine 114 result in more efficiently compressed data in the storage system embodied in a data structure 324 in which representative data is organized for delta encoding the corresponding data chunks.

In some embodiments, delta data chunks are not used as base data chunks and so representative data for those delta data chunks are removed from the list of representative data evaluated by comparison and sorting module 111, delta encoding module 112, and similarity matching module 113. For example in FIG. 3, delta representative data with Fingerprints 3 and 6 would not appear in data structure 322.

Figure 4:
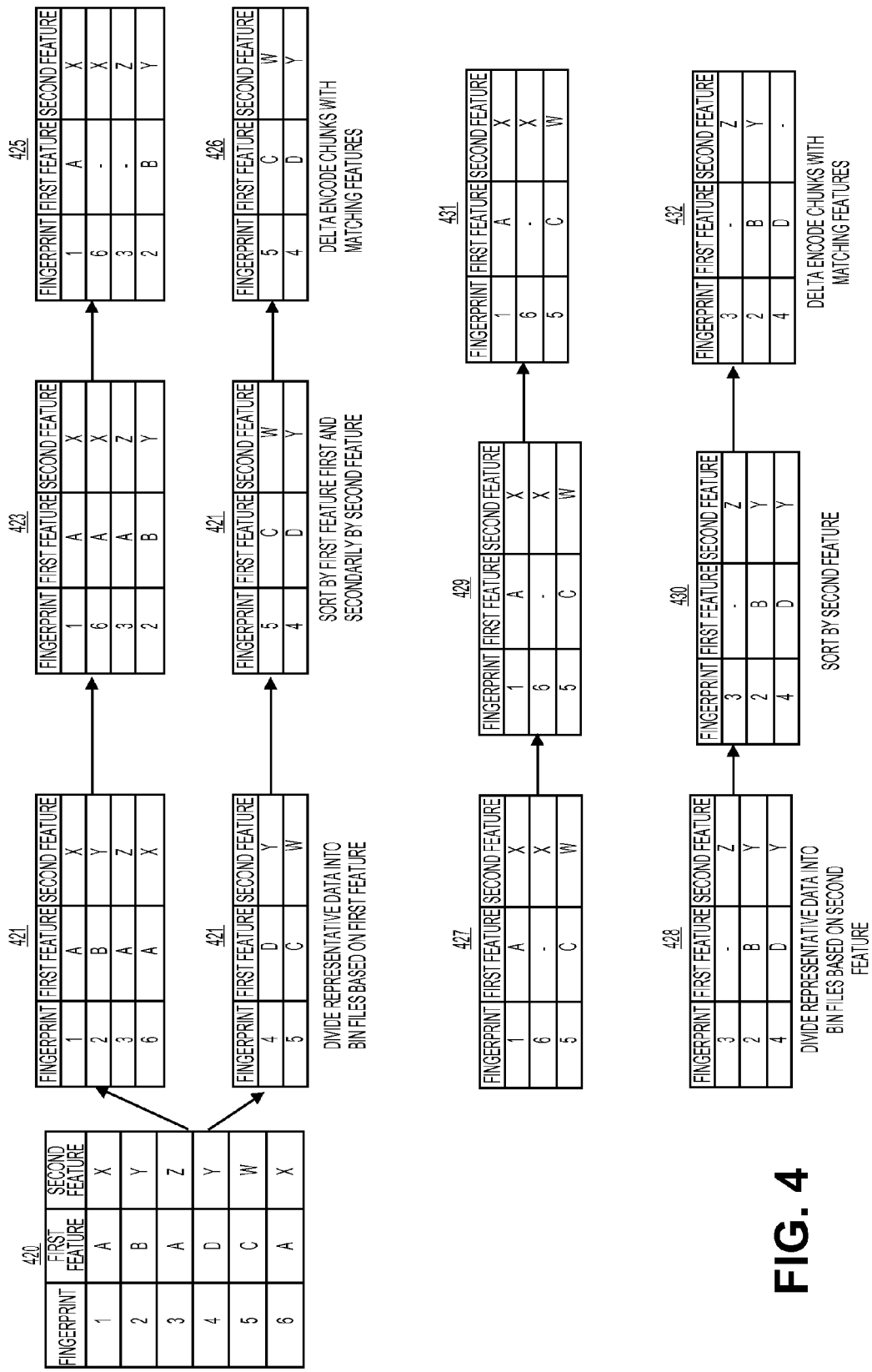
FIG. 4 is a diagram illustrating identifying data as a candidate for delta encoding according to another embodiment of the invention.

In the vein of FIG. 3, FIG. 4 illustrates one embodiment of the invention wherein multiple sorts can be necessary because representative data are composed of more than one feature, fingerprint, or other identifying attribute (or some combination of such values). In one embodiment, a similarity match of multiple features is selected as more likely to improve compression than a similarity match of fewer features by similarity matching module 113. However, FIG. 4 illustrates an embodiment in which representative data are divided into bin files before sorting. A bin file can contain any type of data for computer storage and processing purposes; for example, in one embodiment a bin file is a data structure implemented to organize and separate representative data. The division of representative data 105-106 into more manageable bin files can be done in the storage units 109-110, which can be beneficial when a set of representative data for some data file is too large to fit in main memory 115 (e.g., RAM). Accordingly, in one embodiment each bin file should be sized to fit within main memory 115. In one embodiment, representative data 420 are assigned to a bin file based on the bit patterns of a feature or a fingerprint such that representative data with the same feature are all assigned to the same bin file (e.g., 421-422). In this example, First Feature is initially used for mapping data to appropriate bin files.

Once representative data are divided into bin files, the bin files are individually read into main memory 115. An individual bin file (e.g., 421-422) in main memory 115 can be evaluated in the compression engine 114. In one embodiment, an individual bin file in the compression engine 114 is first sorted in the comparison and sorting module 111. As illustrated in FIG. 4, a bin file 421 holding representative data with First Feature and Second Feature is sorted first on First Feature and then sorted on Second Feature. The sorted bin file 423 is subsequently assessed in similarity matching module 113 wherein base representative data with Fingerprint 1 is chosen and delta representative data for all First Feature and Second Feature matches, Fingerprint 6, and First Feature matches, Fingerprint 3, are associated with the matching base representative data with Fingerprint 1.

In one embodiment of FIG. 4, the determination of base representative data and delta representative data for a bin file 427 is relayed to delta encoding module 112. In one embodiment of delta encoding module 112, the target data chunks with delta representative data having Fingerprints 3 and 6 are removed (i.e., deleted) from the storage system 104 through chunk storage engine 116 and a delta data chunk is generated for each target data chunk as the difference between the target data chunk and a data chunk with associated base representative data having Fingerprint 1. The delta data chunk (not illustrated) is then sent to chunk storage engine 116 to be stored in data storage system 104.

Still referring to FIG. 4, this process is repeated for individual bin file 422. Thus, individual bin file 422 is read into main memory 115 and delegated to compression engine 114. In compression engine 114, bin file 422 is sorted in the same manner as bin file 421 in comparison and sorting module 111 (i.e., sorted on Features A and B). Accordingly, sorted bin file 424 is relayed to similarity matching module 113 to determine base representative data and delta representative data. However, in the exemplary embodiment of FIG. 4, the sorted bin file 424 does not have any feature matches; therefore, in one embodiment compression engine 114 would terminate and no changes would propagate from main memory 115 to storage units 109-110.

Again referring to the illustrative embodiment of FIG. 4, delta encoding through similarity matching cannot be complete after comparison and sorting module 111 and similarity matching module 113 have traversed representative data 420 and distributed representative data into bin files based on First Feature. Therefore, the representative data of data structure 420 can be distributed into bin files based on Second Feature (e.g., bin files 427-428). This second iteration of separating representative data into bin files 427-428 sized to fit individually into main memory 115 would then follow the same path as bin files 421-422. Thus, bin file 427 is read into main memory 115 where it is evaluated by compression engine 114. Accordingly, representative data in bin file 427 are sorted in comparison and sorting module 111 and then relayed to similarity matching module 113 for identification of base and delta representative data. In FIG. 4, bin file 429 sorted on Second Feature does not have any feature matches that have not already been delta encoded. Consequently, in one embodiment compression engine 114 would terminate and no changes would propagate from main memory 115 to storage units 109-110.

Subsequently, bin file 428 is read into main memory 115 and delivered to compression engine 114. In compression engine 114 bin file 428 is sorted in the comparison and sorting module 111 on Second Feature, resulting in sorted bin file 430. Sorted bin file 430 is then evaluated in similarity matching module 113 wherein a Second Feature match for representative data having Fingerprint 2 and representative data having Fingerprint 4 is evident; thus, representative data with Fingerprint 2 is chosen as base representative data and representative data with Fingerprint 4 is associated with base representative data 2 as delta representative data 4. As a result, similarity-matched bin file 430 is relayed to delta encoding module 112. In one embodiment of delta encoding module 112, target data chunk with delta representative data 4 is removed (i.e., deleted) from storage system 104 through chunk storage engine 116 and a delta data chunk (not illustrated) is generated as the difference between the target data chunk and a data chunk with associated base representative data 2. The delta data chunk is then sent to chunk storage engine 116 to be stored in data storage system 104.

According to the embodiment of FIG. 4 described above, representative data with two features require two sorts in compression engine 114: a first sort on First Feature and then Second Feature to find all two-feature matches and all one-feature matches of First Feature and a second sort on Second Feature to find all Second Feature matches. This process can be extrapolated so that three features require five sorts, four features require twelve sorts, and so forth. Thus, the summation for the number of sorts required for a set of representative data with N features:

$$\left(\sum_{k=1}^{N} \frac{N!}{k!(N-k)!}\right) - (N-1)$$

The final permutation of a k-set gives the first permutation of a k−1 set without resorting; therefore, the summation is optimized to save N−1 sorts (depicted above).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method for data deduplication, the method comprising:
   in response to a request for compressing data in a data storage system, partitioning the data into a plurality of data chunks, including a target data chunk and a base data chunk;
   generating representative data for the target data chunk and the base data chunk by applying a predetermined algorithm to the target data chunk and the base data chunk;
   sorting the representative data for the target data chunk and the base data chunk based on similarity of bit patterns of the target data chunk and the base data chunk to form a sorted representative data list, wherein sorting the representative data further includes dividing representative data of the plurality of data chunks into a plurality of bin files where directly adjacent representative data of the plurality of data chunks are placed in a same bin file, each of the plurality of bin files sized to fit within main memory of a data storage system, reading into main memory each of the plurality of bin files, and comparing and sorting each of the plurality of bin files according to a first feature defined in representative data of the plurality of data chunks;
   generating a delta data chunk as the difference between the target data chunk and the base data chunk where the representative data of the target chunk is directly adjacent to the representative data of the base data chunk in the sorted representative data list; and
   storing the delta data chunk and the base data chunk in the data storage system, wherein the delta data chunk and the base data chunk represent the target data chunk.

2. The method of claim 1 wherein the base data chunk has multiple features of the representative data similar to multiple features of the representative data of the target data chunk.

3. The method of claim 1 wherein the base data chunk is chosen based on age comparison to the target data chunk.

4. The method of claim 1 wherein the base data chunk is chosen based on physical locality in the data storage system to the target chunk.

5. The method of claim 1, wherein the delta data chunk is stored separately from the target data chunk and the base data chunk.

6. The computer-implemented method of claim 5, wherein the target data chunk is removed from the data storage system after the delta data chunk is generated.

7. The method of claim 1, further comprising:
   transmitting the delta data chunk and the base data chunk to an auxiliary data storage system.

8. The method of claim 1, further comprising:
   estimating the compression achievable of delta encoding the target data chunk relative to the base data chunk.

9. The method of claim 1 wherein sorting the representative data occurs for each feature of the representative data such that the representative data in the representative data list is first sorted based on the first feature of the plurality of data chunks and subsequently sorted based on a second feature of the plurality of data chunks, and
   wherein during each sorting iteration delta data chunks are generated for one or more pairs of data chunks that have directly adjacent representative data in the representative data list.

10. The computer-implemented method of claim 1, wherein generating representative data comprises:
    inputting a data chunk into a collision-resistant hash function;
    receiving from the hash function a hash value for the data chunk;
    assigning the hash value to the data chunk.

11. The computer-implemented method of claim 10, wherein generating representative data further comprises:
    extracting one or more features from each of the plurality of data chunks; and
    assigning the features to each of the plurality of data chunks so that representative data includes the features and the hash value.

12. The computer-implemented method of claim 1, wherein the predetermined algorithm extracts one or more features from each of the plurality of chunks.

13. A non-transitory computer-readable storage medium having instructions stored therein, which when executed by a computer, cause the computer to perform a method for data deduplication, the method comprising:
    in response to a request for compressing data in a data storage system, partitioning the data into a plurality of data chunks, including a target data chunk and base data chunk;
    generating representative data for the target data chunk and the base data chunk by applying a predetermined algorithm to the target data chunk and the base data chunk;
    sorting the representative data for the target data chunk and the base data chunk based on similarity of bit patterns of the target data chunk and the base data chunk to form a sorted representative data list, wherein sorting the representative data further includes dividing representative data of the plurality of data chunks into a plurality of bin files where directly adjacent representative data of the plurality of data chunks are placed in a same bin file, each of the plurality of bin files sized to fit within main memory of a data storage system, reading into main memory each of the plurality of bin files, and comparing and sorting each of the plurality of bin files according to a feature defined in representative data of the plurality of data chunks;
    generating a delta data chunk in the data storage system as the difference between the target data chunk and the base data chunk where the representative data of the target chunk is directly adjacent to the representative data of the base data chunk in the sorted representative data list; and
    storing the delta data chunk and the base data chunk in the data storage system, wherein the delta data chunk and the base data chunk represent the target data chunk.

14. The non-transitory computer-readable storage medium of claim 13 wherein the base data chunk has multiple features of the representative data similar to multiple features of the representative data of the target data chunk,
    wherein sorting the representative data occurs for each feature of the representative data such that the representative data in the representative data list is first sorted based on a first feature of the plurality of data chunks and subsequently sorted based on a second feature of the plurality of data chunks, and
    wherein during each sorting iteration delta data chunks are generated for one or more pairs of data chunks that have directly adjacent representative data in the representative data list.

15. The non-transitory computer-readable storage medium of claim 13 wherein the base data chunk has a similar age as the target chunk.

16. The non-transitory computer-readable storage medium of claim 13, wherein the delta data chunk is stored separately from the target data chunk and the base data chunk.

17. The non-transitory computer-readable storage medium of claim 13, wherein the method further comprises:
transmitting the delta data chunk and the base data chunk to an auxiliary data storage system.

18. The non-transitory computer-readable storage medium of claim 13, wherein the method further comprises:
estimating the compression achievable by delta encoding the target data chunk relative to the base data chunk.

19. The non-transitory computer-readable storage medium of claim 13, wherein the method further comprises:
removing the target data chunk from the data storage system after the delta data chunk is generated.

20. A data storage system, comprising:
a memory unit to store a chunk storage engine, a compression engine, a comparison and sorting module, a similarity matching module and a delta encoding module;
a processor coupled to the memory unit, the processor configured to execute the chunk storage engine, the compression engine, the comparison and sorting module, the similarity matching module, and the delta encoding module,
the chunk storage engine to partition data into a plurality of data chunks, including a target data chunk and a base data chunk,
the compression engine to generate representative data for the target data chunk and the base data chunk by applying a predetermined algorithm to the target data chunk and the base data chunk,
the comparison and sorting module to sort the representative data for the target data chunk and the base data chunk based on similarity of bit patterns of the target data chunk and the base data chunk to form a sorted representative data list, wherein sorting the representative data by the comparison and sorting module further includes dividing representative data of the plurality of data chunks into a plurality of bin files where proximate representative data of the plurality of data chunks are placed in a same bin file, each of the plurality of bin files sized to fit within main memory of a data storage system, reading into main memory each of the plurality of bin files, and comparing and sorting each of the plurality of bin files according to a feature defined in representative data of the plurality of data chunks,
the similarity matching module to evaluate where representative data of the target chunk are directly adjacent to representative data of the base data chunk in the sorted representative data list,
and the delta encoding module to generate a delta data chunk as the difference between the target data chunk and the base data chunk, wherein the delta data chunk and the base data chunk represent the target data chunk.

21. The data storage system of claim 20, wherein the target data chunk is removed from the data storage system after the delta data chunk is generated.

* * * * *